United States Patent [19]

Kawamura et al.

[11] Patent Number: 5,164,840
[45] Date of Patent: Nov. 17, 1992

[54] APPARATUS FOR SUPPLYING CONTROL CODES TO SOUND FIELD REPRODUCTION APPARATUS

[75] Inventors: Akihisa Kawamura; Masaharu Matsumoto; Mitsuhiko Serikawa; Ryo Tagami; Katsuaki Sato; Hiroko Yoshida, all of Osaka; Hikari Hashimoto, Kobe, all of Japan

[73] Assignee: Matsushita Electric Industrial Co., Ltd., Osaka, Japan

[21] Appl. No.: 400,190

[22] Filed: Aug. 28, 1989

[30] Foreign Application Priority Data

Aug. 29, 1988 [JP] Japan .................................. 63-213962
Aug. 29, 1988 [JP] Japan .................................. 63-213963
Aug. 29, 1988 [JP] Japan .................................. 63-213964

[51] Int. Cl.⁵ ............................................. H04N 5/91
[52] U.S. Cl. .................................... 358/341; 358/343; 381/1; 381/17; 381/18
[58] Field of Search ............... 358/335, 341, 343, 906; 360/18, 19.1, 27, 33.1; 369/48, 49; 381/1, 17, 18, 103, 104

[56] References Cited

U.S. PATENT DOCUMENTS 4,792,974 12/1988 Chace ...................................... 381/1
4,862,278 8/1989 Dann et al. .......................... 358/225
5,027,687 7/1991 Iwamatsu .............................. 84/600

FOREIGN PATENT DOCUMENTS 58-3639 1/1983 Japan .

Primary Examiner—Tommy P. Chin
Assistant Examiner—Robert Chevalier
Attorney, Agent, or Firm—Pollock, VandeSande & Priddy

[57] ABSTRACT

Control codes for controlling processing of an audio signal by a sound field variation circuit to produce desired sound fields are recorded on a monaural track of a video tape concurrent with recording of video and audio signals, and can thereby be subsequently played back for producing sound fields which are respectively synchronized with video images.

14 Claims, 12 Drawing Sheets

1

APPARATUS FOR SUPPLYING CONTROL CODES TO SOUND FIELD REPRODUCTION APPARATUS

BACKGROUND OF THE INVENTION

1. Field of Applicable Technology

The present invention relates to an apparatus for audio reproduction utilizing audio signals produced from an audio signal source such as a compact disc player, and in particular to an apparatus for controlling such an audio reproduction apparatus by supplying respective digital codes, to produce various arbitrary sound fields which will reproduce desired acoustic characteristics such as those of a concert hall etc.

2. Prior Art Technology

In recent years, various new types of audio and audio-visual apparatus have been developed, such as compact disc players, digital audio tape recorders, high-fidelity video recorders, high-definition television systems, etc. Accompanying these developments, the need has arisen for equipment which will enable various arbitrary sound fields to be produced, utilizing the audio signals that are produced from such a new type of audio or audio-visual apparatus For example it may be desired to produce within a small listening room a sound field which will give the impression to a listener of being within a large concert hall. Alternatively, it may be desired to vary the sound field such as to suitably match a video display with an audio output which is being concurrently generated e.g. to control the sound field that is produced by loudspeakers which are reproducing audio signals derived from the sound track of a video recorder, such that the acoustic impression that is conveyed to a listener/viewer will be matched to the video images that are being concurrently produced. Various methods of altering such a sound field may be envisaged. Such alteration could consist for example of simply varying the sound volume emitted from one or more loudspeakers in accordance with the apparent distance of a sound-emitting object or person that appears in a corresponding video image, or varying the position (within a specific listening region) at which such a sound-emitted object or person seems (to a user situated within that region) to be located in the listening region. The latter type of apparent position variation could be executed in two dimensions within the listening region, by using at least two loudspeakers, or in three dimensions, by using a more complex arrangement of loudspeakers. However it should be noted that the scope of the present invention also applies to an apparatus whereby sound field alteration is performed very simply, by controlling an audio signal such as to vary the sound volume that is produced from one or more loudspeakers.

It is now possible to readily process audio signals by digital circuits such as to convert the audio signals to a form which will reproduce a desired sound field within a specific listening region, e.g. when the converted audio signals are supplied to respective channels of a multi-channel audio amplifier and loudspeaker system. In the case of digital audio signals obtained from a source such as a compact disc player, such digital processing can be directly executed. If the audio signals are originally of analog form, they can be converted to digital form by digital/analog conversion and then digitally processed.

In the prior art, systems have been proposed for controlling an audio signal produced by an audio-visual apparatus, to reproduce various arbitrary sound fields. Such a prior art system basically consists of an apparatus for producing an input audio signal (e.g. the audio signal playback section of a video cassette recorder, abbreviated in the following to VCR), a sound field variation circuit for processing that input audio signal to obtain audio signals that will reproduce specific sound fields, with the particular sound field that is reproduced being determined by a digital control code that is supplied to the sound field variation circuit, stereophonic (or quadraphonic) amplifiers and loudspeakers driven by the output audio signals from the sound field variation circuit to thereby generate the desired sound fields within a listening region, and a section for generating respective digital control codes which are inputted to the sound field variation circuit to obtain desired corresponding sound fields. Assuming that such a system is used with a VCR, the operation is as follows. As a listener/viewer observes a video display that is generated from a video signal produced from the VCR, he can selectively vary the sound field with which the audio signals from the VCR are reproduced, by actuating the control code generating section to input corresponding control codes to the sound field variation circuit. In this way, whereas the actual contents of the audio signals that are reproduced within the listening region are determined by the audio signals produced by playback from the VCR, the characteristics of the sound field that is thereby produced within the listening region are selectively determined by the listener, by inputting specific control codes.

In this way, the listener can vary the sound field within the listening region such as to appropriately match the images that are currently being produced from the VCR video signal, by manually selecting successive control codes that are supplied to the sound field variation circuit. However each time the listener/viewer plays that audio/visual material using the VCR, it is necessary to repeat this sequence of manual operations for selecting the control codes such as to match the video images.

SUMMARY OF THE INVENTION

It is an objective of the present invention to provide an apparatus for generating sound field control codes to be supplied to a sound field variation apparatus, whereby a sound field produced by reproduction of an audio signal can be varied in a predetermined manner and in a predetermined sequence, e.g. in synchronism with variations in images that are reproduced from a VCR. In this way for example, the sound field can be successively varied in accordance with the image contents of a video tape, with the sound field variations taking place in an identical manner each time that the video tape is replayed.

Alternatively, the control codes can for example be generated in accordance with the zoom factor of a zoom lens of a video camera which is producing a video signal that is being recorded on the tape together with the command codes, although on mutually separate recording tracks. In this way, upon playback of the video tape, successive sound fields can be generated which vary in accordance with changes in object size in a display image, such changes resulting from "zooming" the camera lens. The reproduced sound volume can thereby, for example, be varied in accordance with the zoom factor.

An apparatus according to the present invention can also be utilized to generate control codes whereby the positions of "sound images", i.e. the audibly perceived apparent positions of sound sources within a listening region, can be varied in a fixed sequence, with each position being maintained for a predetermined time interval.

According to one embodiment the invention comprises, in a sound field variation apparatus having a source of an audio signal, a source of a video signal, and sound field variation circuit means coupled to receive an input audio signal and sound field control codes and controlled by the control codes for processing the input audio signal to produce output audio signals for driving loudspeakers to produce sound fields which are respectively determined by the control codes, means for supplying the sound field control codes to the sound field variation circuit means, comprising:

means for selecting successive ones of the sound fields and for generating sound field control codes respectively corresponding to selected sound fields;

control code recording means for recording the sound field control codes on a recording track of a video tape, and video and audio signal recording means for recording the audio and video signals on recording tracks of the video tape concurrent with recording of the control codes; and control code playback means for playback of the sound field control codes from the video tape and supplying the control codes to the sound field variation circuit means to control the processing, and video and audio signal playback means for playback of the audio and video signals from the video tape concurrent with playback of the control codes and for supplying the audio signal to the sound field variation circuit means as the input audio signal thereof.

With an apparatus having a configuration as set out above, whereby control codes are recorded on a video tape of a VCR (e.g. on a monaural audio recording track of the tape), it becomes possible to record control codes for respective sound fields that are appropriate for successive images recorded on the tape, at the same time that audio signals are recorded on the stereophonic audio recording track of the tape. Furthermore since the apparatus includes components for reproducing the control codes when the tape is played, and for transferring the control codes to a sound field variation apparatus, it becomes possible to repetitively reproduce appropriate sound fields for respective video images that are reproduced from the tape, each time that the tape is played.

According to another embodiment, the invention comprises, in a sound field variation apparatus having sound field variation circuit means coupled to receive an input audio signal and position control codes and controlled by the position control codes for processing the input audio signal to produce output audio signals for driving loudspeakers to produce sound fields which are respectively determined by the position control codes such as to produce respective sound images at specific positions within a listening room, means for supplying the position control codes to the sound field variation circuit means, comprising:

position data input means manually operable for arbitrarily selecting successive sound image positions within the listening room and for generating position control codes respectively corresponding to the positions;

set time data input means manually operable for arbitrarily selecting respective time durations for the sound image positions and for generating time data values respectively corresponding to the time durations;

memory means for storing the sound field position control codes and time data values;

data register means for holding successive ones of the sound field position control codes and for supplying a currently held position control code to the sound field variation circuit means; and control means for successively reading out each of the sound field position control codes from the memory together with a corresponding one of the time data values, for transferring the position control code to the data register, and for transferring a succeeding one of the position control codes to the data register when a time interval expressed by the corresponding time data value has elapsed.

DESCRIPTION OF PREFERRED EMBODIMENTS

Figure 1:
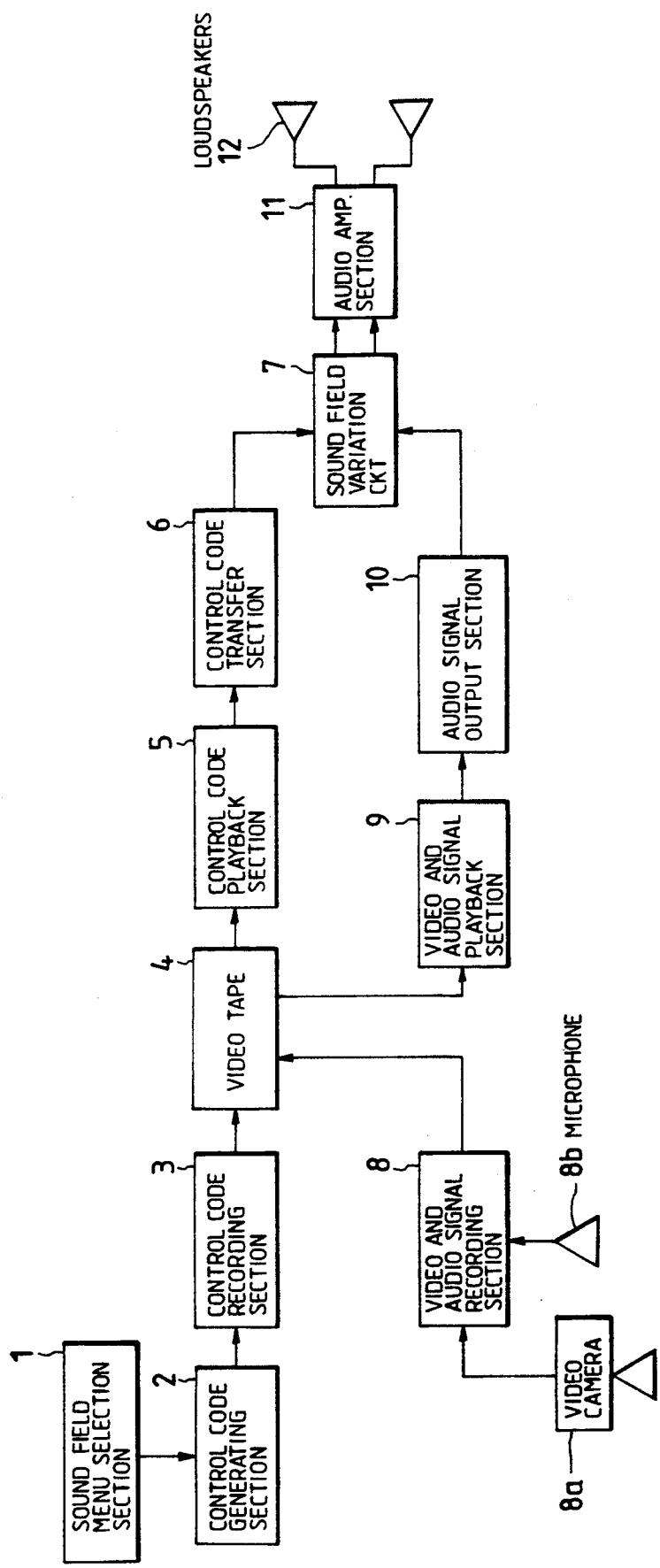
FIG. 1 is a block diagram of a sound field variation apparatus incorporating a first embodiment of a control code generating apparatus according to the present invention.

FIG. 1 is a conceptual block diagram of a sound field variation apparatus based on a video tape recorder or VCR. which incorporates a first embodiment of a control code generating apparatus according to the present invention. In FIG. 1, numeral 1 denotes a sound field menu selection section, which can be operated by a user to select a desired sound field that is to be recorded on video tape and subsequently reproduced. The sound field menu selection section 1 includes a memory section (not shown in the drawings) having stored therein various data values corresponding to a "menu" of respectively different sound fields, which can be reproduced by the apparatus, as described hereinafter. The "menu" of sound fields of this embodiment consists, for example of a set of ten different sound fields which are listed as "concert hall A, concert hall B, concert hall C, church D, church E, cathedral F, catheral G, stadium H, stadium I", and so on. That is to say, respective sound fields can be reproduced by means of a plurality of loudspeakers 12 which are situated around a listening region and are driven by respective audio signals that have been processed by the sound field variation circuit 7 to have appropriate relative phase and amplitude values, whereby the acoustic characteristics of the various items on the sound field menu can be selectively simulated within that listening region. The sound field menu selection section 1 also includes a manually operable switch (not shown in the drawings) which can be actuated to select a desired sound field from that "menu", by reading out the corresponding data value from the internal memory of the sound field menu selection section 1, and supplying that data value to a control code generating section 2. The control code generating section 2 responds to such an input data value by producing a corresponding control code, i.e. a specific digital code that is subsequently utilized in producing the specified sound field as described hereinafter. Each control code that is produced from the control code generating section 2 is supplied to a control code recording section 3, which produces a corresponding recording signal which is then recorded on a monaural signal recording track of a videotape 4. At the same time that such recording is taking place, a video signal (from some video signal source, which in this example is a video camera 8a), and an audio signal (in this example, produced from a microphone 8b) are converted to respective recording signals by a video and audio signal recording section 8, and recorded on a video track and a stereophonic sound track of the video tape 4.

Numeral 5 denotes a control code playback section which receives a playback signal from the monaural recording track of the video tape 4 at the time of playback of the tape, and derives the successive control codes that have been recorded on the monaural recording track. Numeral 6 denotes a control code transfer section, which transfers the reproduced control codes from the control code playback section 5 to a sound field variation circuit 7. Numeral 9 denotes a video and, audio signal playback section, which receives the recorded video and audio signals from the video tape 4 at the time of playback, with the video signal being transferred to a video signal processing and display section (not shown in the drawing) and the audio signal being transferred via an audio signal output section 10 to be inputted to the sound field variation circuit 7.

If the output audio signal from the audio signal output section 10 is in digital signal form (i.e. is a PCM signal), then it is directly processed by the sound field variation circuit 7 in accordance with the contents of the control code that is currently being supplied to the sound field variation circuit 7 from the control code transfer section 6, to produce output audio signals (in this example, two channels for stereophonic reproduction) that are applied via an thereby generate (within a listening space in which the loudspeakers are located) the sound field that is specified by the control code. If the output audio signal from the audio signal output section 10 is of analog form, then an analog/digital (A/D) converter is incorporated within the sound field variation circuit 7 for converting that audio signal to digital form, whereupon the processing described above for producing the sound field specified by the control code is executed.

It can thus be understood that with this embodiment of a sound field variation apparatus, during a recording mode of operation, the user observes images that are being recorded on the video tape 4 by the video signals from the camera 8a that are converted to a video recording signal by the video and audio signal recording section 8 (as corresponding audio signals are also being recorded on the stereophonic recording tracks of the tape), and actuates the switch of the sound field menu selection section 1 to select successive items from the sound field "menu" of the sound field menu selection section 1. That is to say, each time that a change occurs in the contents of video image that is being recorded, the user can select a new sound field item from the sound field menu selection section 1, that is appropriately matched to the image contents. Each time a new sound field from the menu is thus selected, a corresponding control code is produced from the control code generating section 2, and is recorded by the control code recording section 3 on the monaural recording track of the video tape 4, concurrently with the video image that is being recorded on the video track of the tape at that time.

Subsequently, in a playback mode of operation, a playback signal obtained from the monaural recording track of the video tape 4 is supplied to the control code playback section 5 which thereby derives the respective control codes that have been recorded, and applies these to the control code transfer section 6 in synchronism with playback and display of the image contents of the video tape 4. The control codes are transferred from the control code transfer section 6 to the sound field variation circuit 7 (e.g. with each control code being applied continuously from the control code transfer section 6 to the sound field variation circuit 7 until the succeeding control code is supplied from the control code playback section 5) for digital processing of the playback audio signal that is supplied to the sound field variation circuit 7 from the audio signal output section 10. While a control code is thus being applied to the sound field variation circuit 7 from the control code transfer section 6, the sound field variation circuit 7 converts the audio signal from the audio signal output section 10 into corresponding multi-channel audio signals (in this example, two channels) which have the requisite relative phase and amplitude characteristics for driving the loudspeakers 12 via the audio amplifier section 11 to produce the desired sound field.

It will thus be apparent that with this embodiment, since the control codes for reproducing specific sound fields in synchronism with video images obtained by playback of the video tape 4 are recorded on the video tape 4 together with these video images, it is no longer necessary for the user to again perform selection of successive desired sound fields each time that these video images are reproduced. The video tape 4 can thus be repetitively played, with control codes for reproducing sound fields which match successive video images being generated in the same way each time, with no intervention by the user being necessary. This is extremely convenient for the user. Moreover, since the control codes are recorded on a monaural recording track of a video tape, it is possible to easily utilize a prior art VCR to implement this embodiment, without any modifications to the VCR being necessary.

Figure 2:
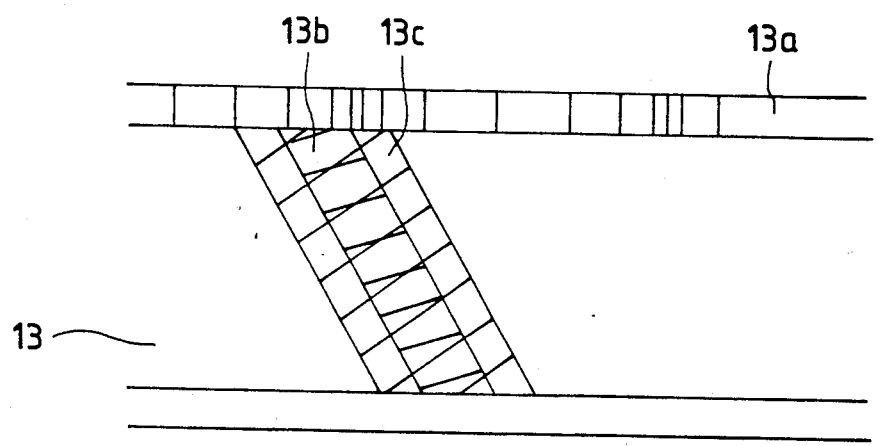
FIG. 2 is a diagram for describing an arrangement of recording tracks on a video tape.

FIG. 2 illustrates the recording pattern of tracks on a video tape. In FIG. 2, a video tape 13 has a monaural recording track 13a, a succession of diagonal stereophonic recording tracks 13b, and a succession of diagonal video recording tracks 13c.

Figure 3:
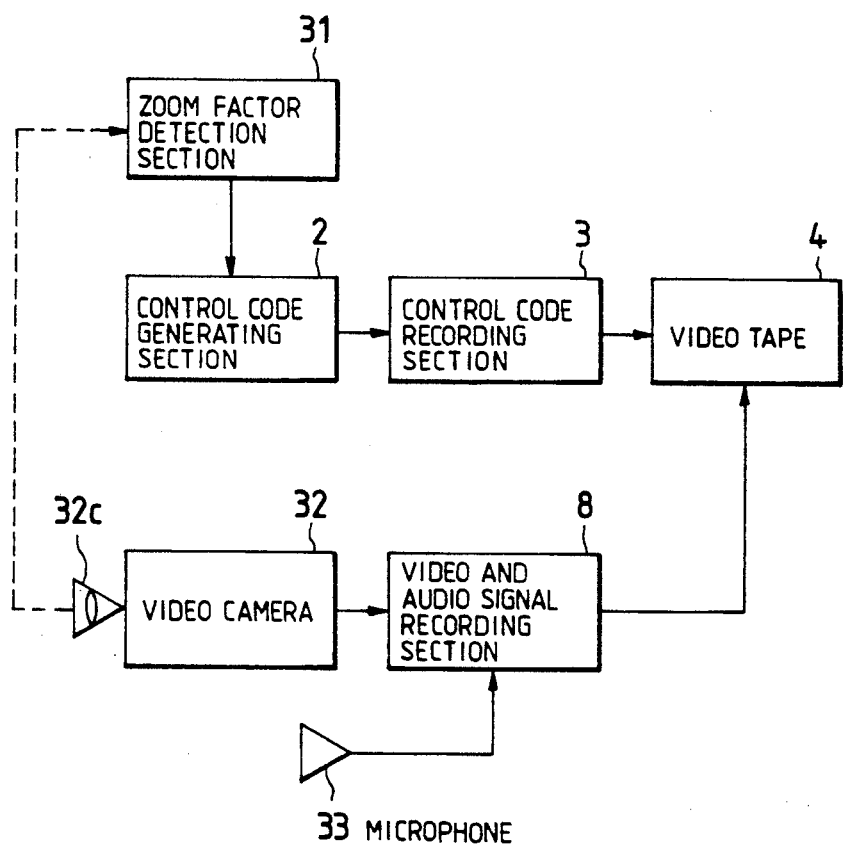
FIG. 3 is a block diagram of a video camera incorporating a second embodiment of a control code generating apparatus according to the present invention.

FIG. 3 is a general block diagram of a video camera apparatus which incorporates a second embodiment of a sound field control code generating apparatus according to the present invention. In FIG. 3, numeral 32 collectively designates the components of a video camera which function to produce a video signal from an image that is viewed by a zoom lens 32c. A zoom factor detection section 31 serves to detect the current zoom factor (i.e. angle of view) of the zoom lens 32c, e.g. by sensing the position of a portion of the lens which moves in accordance with the zoom factor. A control code generating section 2 functions in response to a zoom factor detection data value which is thus produced from the zoom factor detection section 31 in accordance with the lens zoom factor, to produce a corresponding sound field control code. As in the embodiment of FIG. 1, the control codes are then converted to a recording signal by the control code recording section 3, and are recorded on a monaural recording track of a video tape 4. Video and audio signals obtained from the video camera 32 and a microphone 33 are converted to respective recording signals by video and audio signal recording section 8 and are recorded on video and stereophonic sound recording tracks respectively of the video tape 4 by the video and audio signal recording section 8, also as in the first embodiment.

The apparatus shown in FIG. 3 can be utilized directly as a video camera apparatus. The resultant video tapes are subsequently played by using a VCR apparatus having a playback system with a sound field reproduction capability based on a sound field variation circuit 7, as shown in FIG. 1. Alternatively, the apparatus of FIG. 3 could be combined with the playback and sound field reproduction components of the embodiment of FIG. 1 to provide a combination video camera and VCR as for that first embodiment.

A predetermined relationship is established between various values of the zoom factor detection data and the corresponding control codes that are generated by the zoom factor detection section 31. Specifically, when the detected zoom factor indicates that an image that is being viewed by the zoom lens 32c will appear (on a video display, at the time of playback of the video tape 4) to be located substantially distant from the camera, then the corresponding control code that is produced from the control code generating section 2 is determined such as to result in a relatively low volume of sound being produced by the loudspeakers of the playback system at the time of playback of the resultant video tape, i.e. the control code is such as to result in a "distant" sound field being generated at the time of playback. Conversely if the zoom factor indicates, that, an image that is being viewed by the zoom lens 32c will appear to be located substantially close to the camera, then the corresponding control code that is produced from the control code generating section 2 is determined such as to result in a relatively high volume of sound being produced by the loudspeakers of the playback system at the time of playback of the video tape, i.e. a "close-up" sound field is generated. In this way, the successive sound fields that are generated at the time of playback, as determined by the recorded control codes, will appropriately vary in accordance with the apparent distance from the viewer/listener of images that are currently being played from the video tape 4 and displayed.

With the second embodiment, as in the first embodiment, the respective sound fields for which control codes have been recorded on the video tape will be reproduced in synchronism with video images each time that the video tape is played, with no need for a user to execute any sound field adjustment or selection operations.

Although only a single microphone is shown as being utilized for recording an audio signal on the stereophonic recording track of the video tape, in practice this will in practice generally consist of a 2-channel stereophonic microphone, with a stereophonic audio signal being recorded. However it should be noted that even if only a single microphone is utilized at the time of recording, i.e. a monaural audio signal is recorded on the stereophonic recording track of the video tape, it is possible to process a playback monaural audio signal obtained from the video tape 4 by the sound field variation circuit 7 such as to produce stereophonic or quadraphonic multi-channel audio output signals for driving a plurality of loudspeakers, whereby a stereo or quadraphonic sound field can be generated in the listening region.

Figure 4:
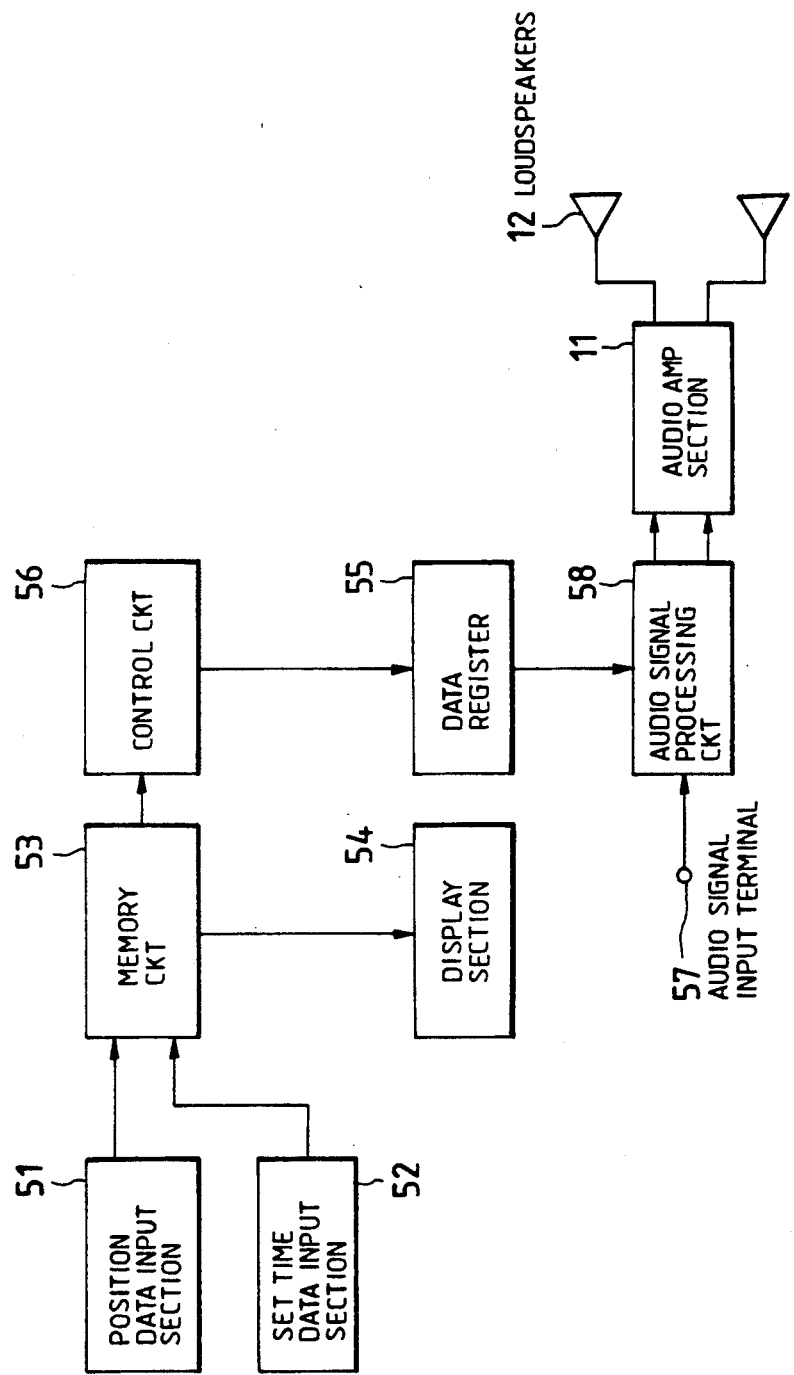
FIG. 4 is a block diagram of a sound field variation apparatus incorporating a third embodiment of a control code generating apparatus according to the present invention.

FIG. 4 is a block diagram of a sound field variation apparatus which incorporates a third embodiment of a sound field control code generating apparatus according to the present invention. In FIG. 4, numeral 51 denotes a position data input section, which is provided with a manually operable control member which can be actuated by a user to input to the apparatus respective position data values, i.e. control codes which will result in a sound image being caused to appear within a listening room at specific positions, as a result of generating specific sound fields within that listening room as described hereinafter. These control codes will therefore be referred to in the following as position control codes. Numeral 52 denotes a set time data input section, which can similarly be actuated by the user to input to the apparatus a data value representing a set time (i.e. a time for which a sound image is to appear at a specific position in the listening room) in correspondence with each position data value that is inputted by using the position data input section 51. Numeral 53 denotes a memory circuit in which are stored the position control codes and set time data values that are inputted from the position data input section 51 and set time data input section 52.

Numeral 54 denotes a display section, which displays the respective positions within the listening room that correspond to the inputted position control codes and the corresponding set times. A control circuit 56 functions to transfer the position control codes to a data register 55, with this transfer operation being executed in accordance with the set time values that are stored in the memory section 53, as described hereinafter.

When a position control code has been transferred from the memory section 53 to the data register 55, the code is supplied to an audio signal processing circuit 8 under the control of the control circuit 56. The audio signal processing circuit 58 thereby executes digital processing of an audio signal that is supplied from an audio signal source (e.g the playback audio signal of a VCR, etc.) to an input terminal 57. The operation of the audio signal processing circuit 58 is similar to that of the sound field variation circuit 7 of the first embodiments described above, but has the specific function of producing sound fields which will cause sound images to appear (to a listener who is within the listening room) at specific positions within the listening room. The term "sound image" as used here refers to an audible impression which is produced on a listener that a specific isolated sound source (e.g. a musical instrument whose performance is currently being reproduced in the listening room) is situated at some specific position within the listening room. Output audio signals from the audio signal processing circuit 58 are transferred through a multi-channel audio amplifier section 11 to a plurality of loudspeakers 12 which are disposed at the periphery of the listening room. Although only two loudspeakers are indicated, in practice it will generally be necessary to provide at least four audio output signal channels from the audio signal processing circuit 58, for driving respective loudspeakers which surround the listening room.

Figure 5:
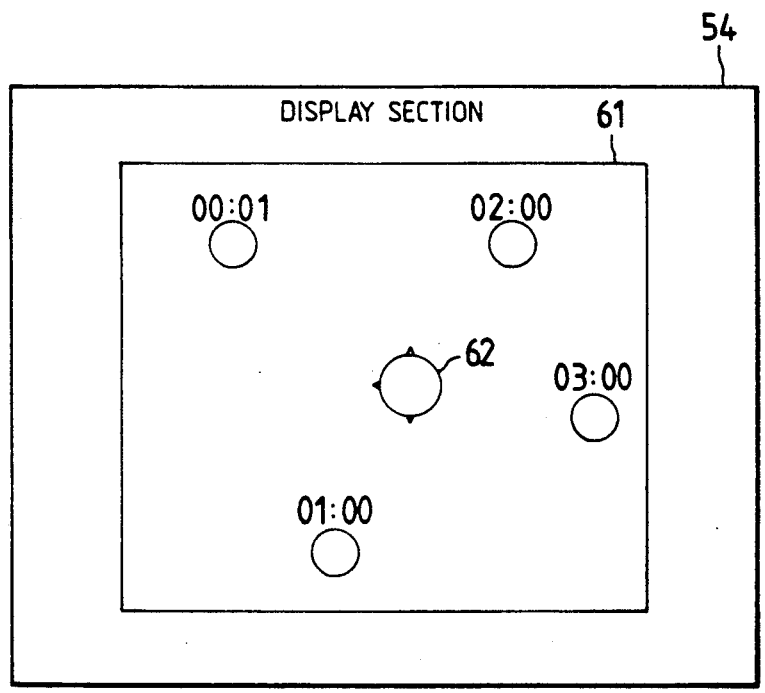
FIG. 5 is a diagram for describing a display section of the embodiment of FIG. 4.

FIG. 5 illustrates a display 61 of a miniaturized plan view of a listening room that is produced by the display section 54, and which is observed by the user while inputting of position and set time data is being performed. In this display, coordinate relationships have a 1:1 correspondence with those of an actual listening room (in which the loudspeakers 12 are situated as described above). A symbol 62 represents the position within the listening room of the listener. When the user selects a sound image position by actuating the position data input section 51, to thereby generate a corresponding position control code from the position data input section 51, the selected position is displayed in the miniaturized listening room display 61 as a circle. When the user then actuates the set time data input section 52 to input a set time value for that sound image position, i.e. a value of time interval for which that sound image is to remain at the selected position, then that set time value becomes indicated in the miniaturized listening room display 61 as numerals which are disposed adjacent to the circle which indicates that selected position. When a position circle and corresponding set time numerals appear on the display 61, this indicates that the corresponding data values have been stored in the memory section 53, and inputting of another sound image position and set time value can then be executed. In this way, a plurality of sound image positions and corresponding set time values can be successively stored in the memory section 53.

Subsequently, when operation of the apparatus is initiated, an audio signal is supplied to the input terminal 57 while at the same time the first position control code which had been stored in the memory section 53 as described above is transferred by the control circuit 56 to the data register 55 and is temporarily held therein. The position control code is thereby supplied to the audio signal processing circuit 58 for executing the requisite processing of the input audio signal, such that a sound field is generated by the outputs from the loudspeakers 12 within the listening room which causes a sound image to audibly appear (i.e. to a listener who is situated within the listening room as indicated by the central symbol in the miniaturized plan display 61) at the position which this condition has continued for the time interval specified as the set time for the first position control code, the control circuit 56 then transfers the next position control code from the memory section 53 to the data register 55, and the above process is repeated to produce a sound image at the position determined by that position control code.

Preferably, the apparatus functions such that each sound image position indication in the display 61 produced by the display section 54, and the corresponding set time value, are erased from the display 61 when they are no longer required, i.e. after the sound image has been produced at that position for the specified time interval.

In the above, it has been assumed that the sound image positions can be selected within the listening room only in 2-dimensions, as indicated in the display 61. However it is also possible to arrange a plurality of loudspeakers around the listening room such as to selectively generate sound images at respective positions in 3-dimensions. In this case, the display section 54 will be configured such as to provide a 3-dimensional display representation of the interior of the listening room, so that the user can selectively input various sound image positions in three dimensions by actuating the position data input section 51 while observing the display produced by the display section 54.

Figure 6:
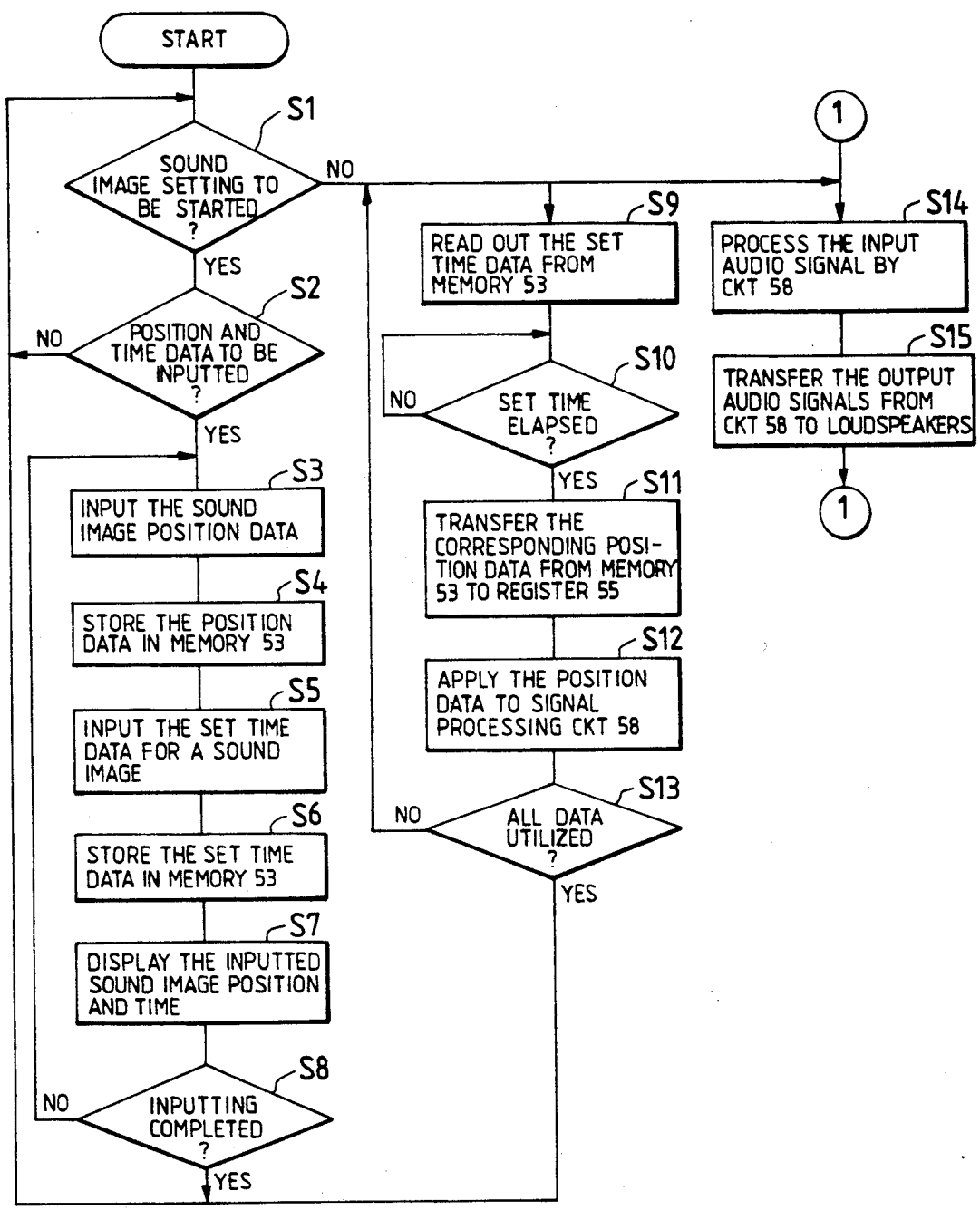
FIG. 6 is a conceptual operating flow diagram, for describing the operation of the embodiment of FIG. 4.

FIG. 6 is a conceptual flow diagram for illustrating the operation of the third embodiment described above.

Figure 7:
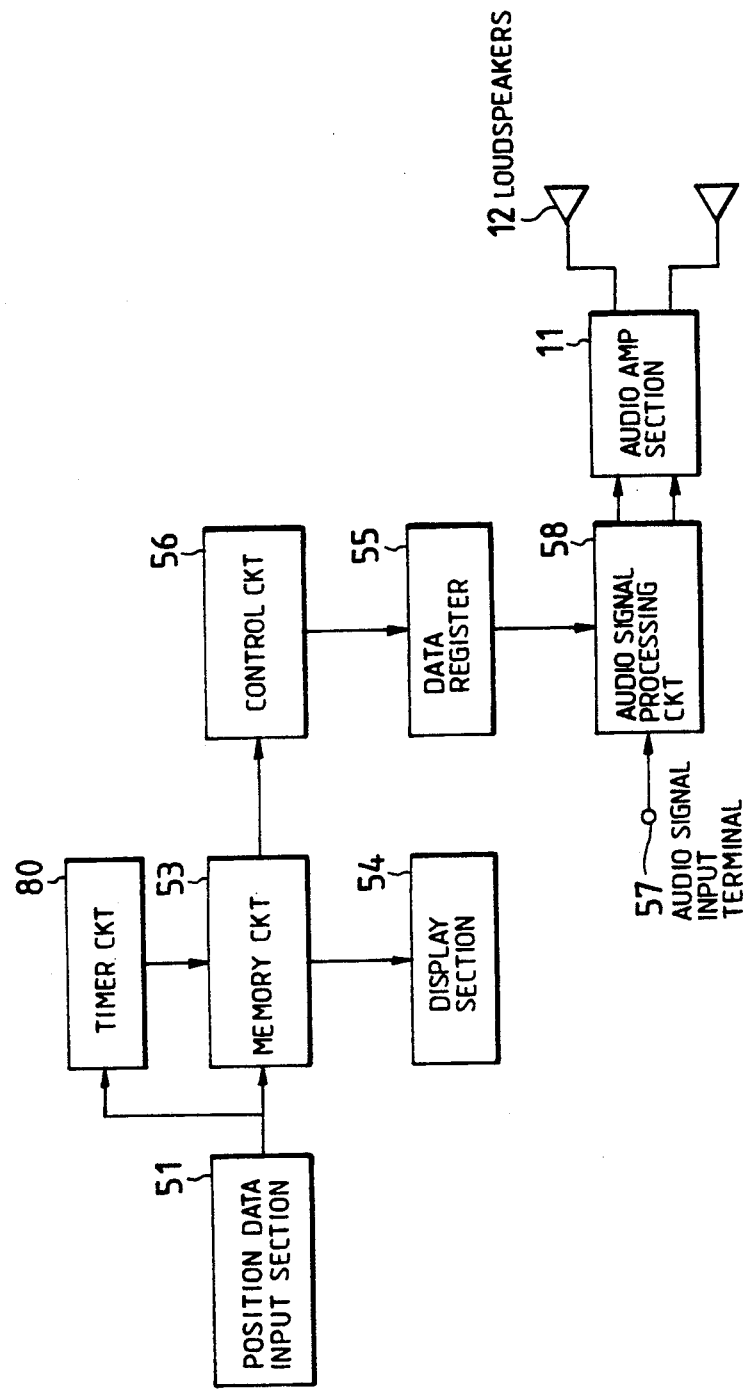
FIG. 7 is a block diagram of a sound field variation apparatus incorporating a fourth embodiment of a control code generating apparatus according to the present invention.

FIG. 7 is a general block diagram of a sound field variation apparatus which incorporates a fourth embodiment of a control code generating apparatus according to the present invention. This is basically similar to the third embodiment described above, and differs only in the way in which values of set time for the various sound image positions are established by the user. In FIG. 7, a timer circuit 80 serves to establish these set time values. Specifically, when a set of position data and set time values are to be stored in the memory section 53 of this embodiment, the user first actuates the position data input section 51 to input a first desired sound field position, while observing the display produced by the display section 54 as described for the first embodiment. The timer circuit 80 then measures the time which elapses from this inputting of a first position data value until the point at which the succeeding position data value is inputted by the user. The resultant value of elapsed time thus measured by the timer circuit 80 is then stored in the memory section 53, as the set time value for the first position data value, i.e. for the first position control code. The same process occurs for the second and third position data values to be inputted, and so on successively.

In the above, it is assumed that the time interval data values that are obtained from the timer circuit 80 and stored in the memory section 53 in correspondence with respective sound image position control codes are thereafter used directly as set time values. However it is also possible to configure the control circuit 56 such that each of the time interval data values that are obtained from the timer circuit 80 and stored in the memory section 53 is multiplied by a specific magnification factor by the control circuit 56, and the resultant time interval value utilized as a set time value during which the corresponding position control code is supplied from the data register 55 to the audio signal processing circuit 58. In this way, the set time values that are actually utilized for sound image generation can be made substantially longer or shorter than the elapsed time values that are measured by the timer circuit 80.

The subsequent operation is identical to that of the third embodiment described above. It will be apparent that the fourth embodiment has the advantage of simplicity of operation, since it is not necessary for the user to actuate a separate input device in order to establish set time values for the sound image positions.

Figure 8:
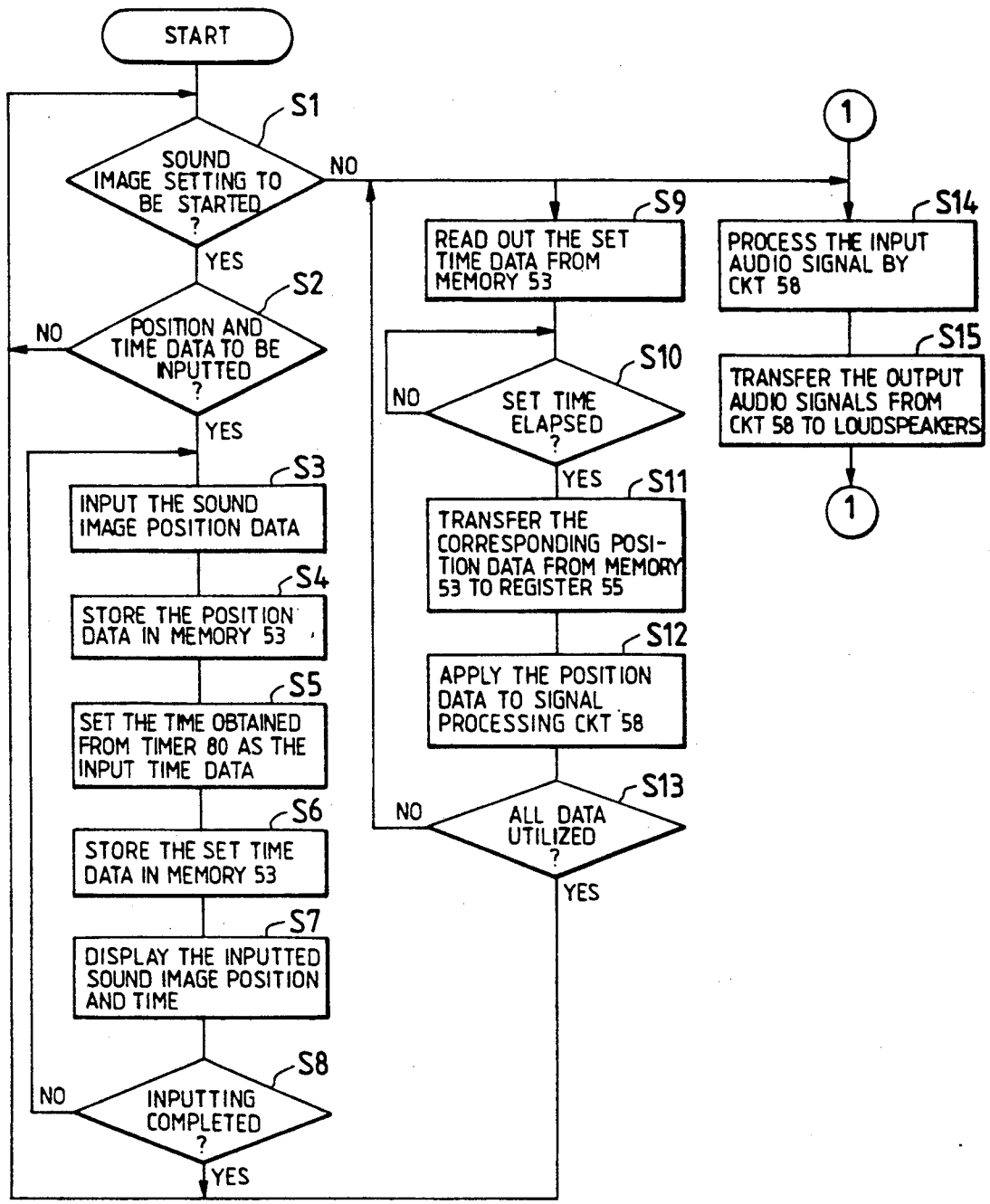
FIG. 8 is a conceptual operating flow diagram, for describing the operation of the embodiment of FIG. 4.

FIG. 8 is a conceptual flow diagram for illustrating the operation of the fourth embodiment described above.

Figure 9:
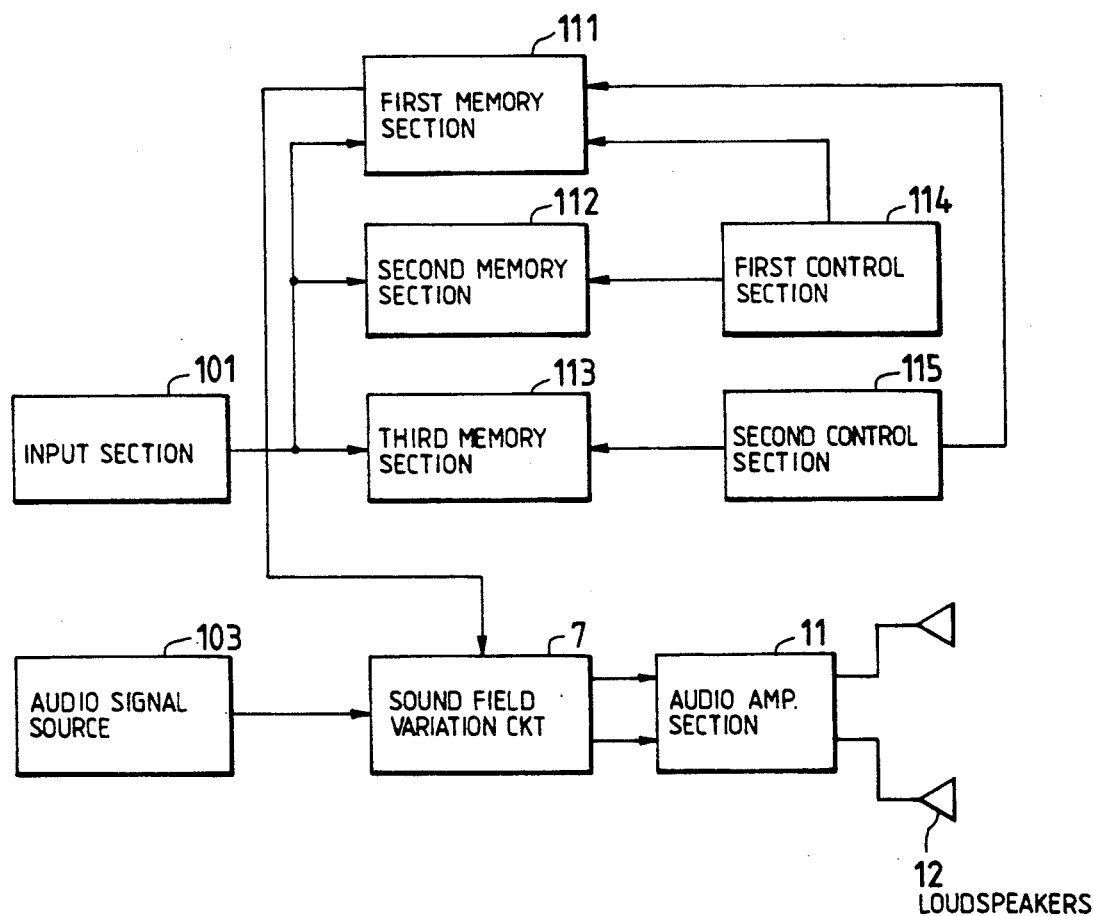
FIG. 9 is a block diagram of a sound field variation apparatus incorporating a fifth embodiment of a control code generating apparatus according to the present invention.

FIG. 9 is a general block diagram of a sound field variation apparatus which incorporates a seventh embodiment of a sound field control code generating apparatus according to the present invention. In FIG. 9, numeral 101 denotes an input section, for selecting respective sound fields that are to be reproduced by the apparatus, by inputting corresponding sound field control codes. An input audio signal is supplied from an audio signal source 103 to a sound field variation circuit 7, which processes the audio signal in accordance with the control codes to produce output audio signals that are transferred through an audio amplifier section 11 to loudspeakers 12. The control codes that are produced from the input section 101 are supplied to respective inputs of a first memory section 111, a second memory section 112 and a third memory section 113. Numeral 114 denotes a first control section, and 115 a second control section.

The operation of this embodiment is as follows. Firstly, a user actuates an operable member (e.g. a switch control member or keyboard, etc. not shown in the drawings) of the input section 101 to select a specific sound field from a "menu" of sound fields which is represented by a set of sound field control codes that are stored in an internal memory of the input section 101. The input section 101 also includes components (as for the third embodiment of FIG. 4) whereby the user can specify the time duration for which each selected sound field is to be produced, and the sequence in which the sound fields are to be reproduced. The input section 101 thereby generates a digital data value (i.e. a sound field control code) for each sound field which is thus selected, together with a data value which specifies the position of that sound field within the sequence in which a plurality of sound fields are to be reproduced, and a data value specifying the time duration for which the sound field is to be reproduced. For each sound field thus selected, the control code and the data value which specifies the position of that sound field within the sound field reproduction sequence are both stored in the first memory section 111. The data value specifying the time duration for which the sound field is to be reproduced is transferred from the input section 101 to be stored in the second memory section 112. A complete sequence of sound fields which are to be thus successively reproduced for respectively specified durations will be referred to in the following as a sound field program. Once a program has been specified, the user can then actuate the input section 101 to input a data value which represents a desired number of times that the program is to be successively repeated, a data value which represents a time point at which these repetitions of the program are to be commenced, and a data value which represents a time point at which these repetitions of the program are to be commenced. These last three data values are transferred from the input section 101 to be stored in the third memory section 113.

After all of the above data values have been stored in the data memories 111 to 113, operations for reproducing the sound fields can be initiated, as follows. When the second control section 115 detects (from the aforementioned time point data value that has been stored in the third memory section 113) that the time point has been reached at which repetitions of the sound field program are to be started, the second control section 115 issues a command to the first memory section 111 whereby the first memory section 111 is caused to transfer the sound field control code for the first sound field of the program to the sound field variation circuit 7. The audio signal from the audio signal source 103 is thereby processed by the sound field variation circuit 7 in accordance with that control code for producing output audio signals which are supplied via the audio amplifier section 11 to the loudspeakers 12, to produce the specified sound field. Subsequently, when the first control section 114 detects (based on the first duration time data value that has been stored in the second memory section 112) that the specified time duration for the first sound field of the program has ended, the first control section 114 issues a command to the first memory section 111 whereby sending of the control code for the first sound field item of the program to the sound field variation circuit 7 is terminated, and whereby the first memory section 111 transfers the control code for the second sound field of the program to the sound field variation circuit 7. The above operations are successively executed for each of the sound fields of the program, until the end of the program is reached.

The second control section 115 monitors the operation of the first memory section 111, and when the second control section 115 detects that the final sound field of the program has been produced for its specified time duration (i.e. that the first complete performance of the sound field program has terminated), the second control section 115 sends a command to the first memory section 111 whereby the control code for the first sound field of the program is once more transferred to the sound field variation circuit 7, to thereby begin a first repetition of the program.

It can be understood from the above that this embodiment enables a program consisting of a sequence of selected sound fields each having a selected duration to be easily specified by the user, and that the user can also easily specify a desired number of repetitions of the program, as well as the times at which the program repetitions are to begin and to end.

Figure 10:
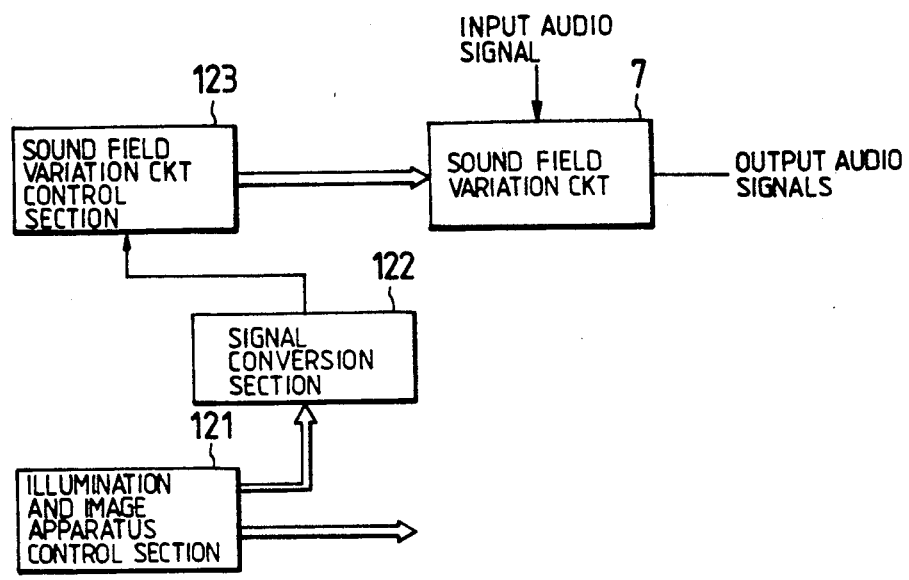
FIG. 10 is a block diagram of a sound field variation apparatus incorporating a sixth embodiment of a control code generating apparatus according to the present invention, controlled by signals form an illumination and image apparatus.

FIG. 10 is a general block diagram of a photo-synchronized sound field variation apparatus which incorporates a sixth embodiment of a sound field control code generating apparatus according to the present invention. In FIG. 10, numeral 121 denotes a control section of an illumination and image apparatus (not shown in the drawings), i.e. an apparatus which produces variable illumination and display images. A signal conversion section 122 serves to convert an output signal which is produced from the illumination and image apparatus control section 121 in synchronism with illumination and display image variations into a suitable form for transfer to a sound field variation circuit control section 123. The sound field variation circuit control section 123 generates sound field control codes in accordance with the output signal supplied from the signal conversion section 122, i.e. in accordance with the current conditions of illumination and image display which are being produced by the illumination and image display apparatus. A sound field variation circuit 7 receives these control codes together with an audio signal produced from an audio signal source (not shown in the drawing), and executes processing of the audio signal in accordance with the currently inputted control code as described hereinabove for the first and second embodiments. Resultant processed audio signals produced from the sound field variation circuit 7 are applied to drive loudspeakers (not shown in the drawings) for producing a sound field which is determined by the control code contents.

Figure 11:
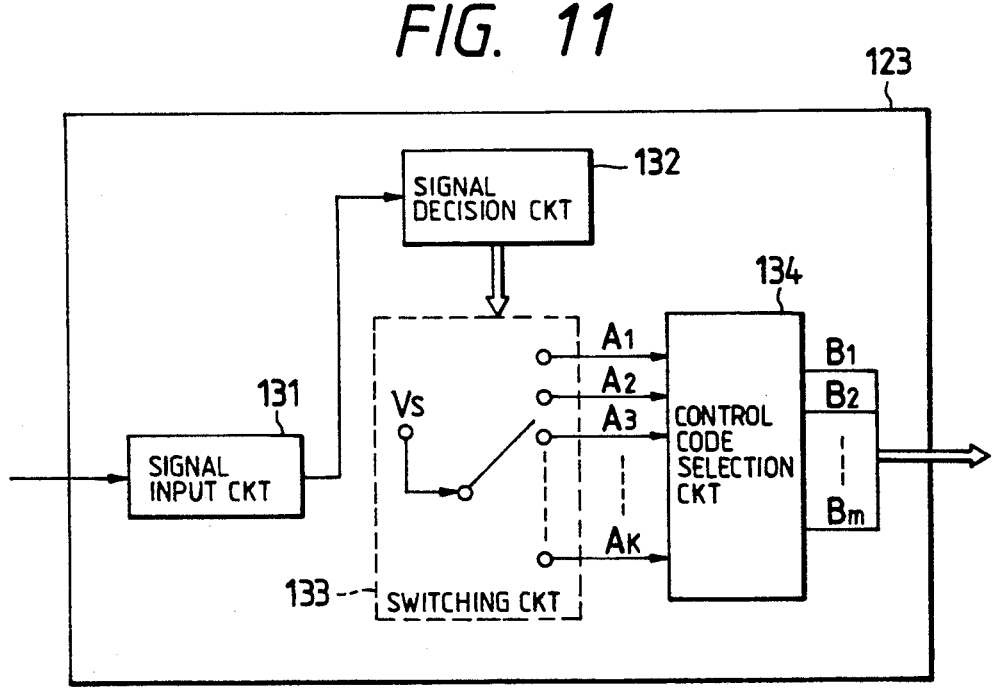
FIG. 11 is a block diagram of a sound field variation circuit control section in the embodiment of FIG. 10.

FIG. 11 is a block diagram of the sound field variation circuit control section 123 shown in FIG. 10. In FIG. 11, numeral 131 denotes a signal input circuit for receiving an output signal that is produced from the signal conversion section 122 shown in FIG. 12. A signal decision circuit 132 judges whether or not the input signal that is being supplied from the signal input circuit 131 corresponds to one of a set of input ports designated as $A_1, A_2, A_3, \ldots A_k$ (where k is an integer) of a control code selection circuit 134. A switching circuit 133 is controlled in accordance with the results of judgement by the signal decision circuit 132 to select one of the input ports $A_1, A_2, A_3, \ldots A_k$ to receive a logic level potential Vs. The control code selection circuit 134 establishes a correspondence between a selected one of the input ports $A_1, A_2, A_3, \ldots A_k$ and a set of control codes designated as $B_1, B_2, B_3, \ldots B_n$ (where n is an integer). In this way, one of the control codes $B_1, B_2, B_3, \ldots B_n$ is selected to be supplied to the sound field variation circuit 7 shown in FIG. 12, in accordance with the signal that is supplied to the signal conversion section 122 from the illumination and image apparatus control section 121.

Figure 12:
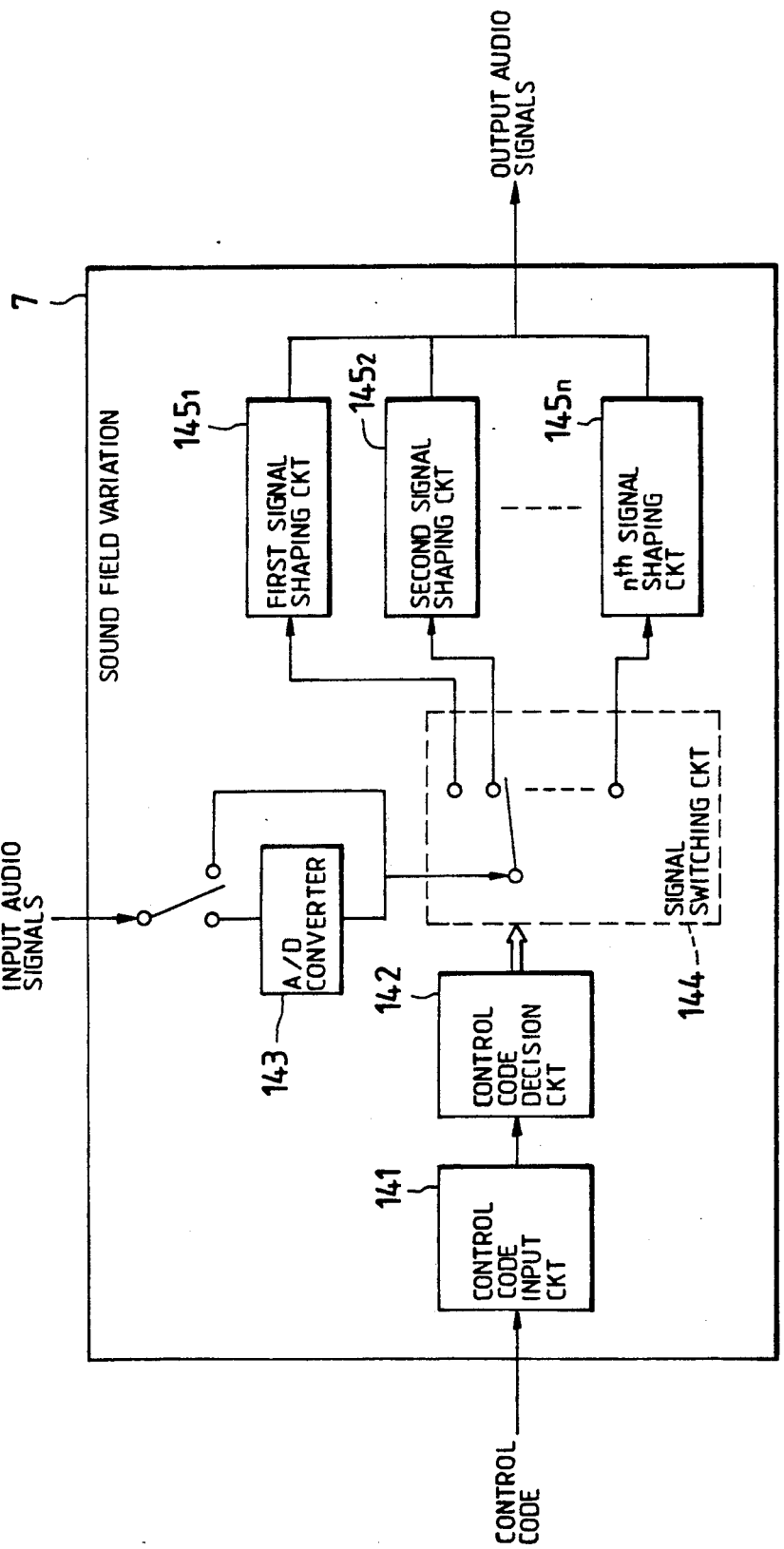
FIG. 12 is a block diagram of a sound field variation circuit in the embodiment of FIG. 10; an FIG. 13 is a block diagram of a sound field variation apparatus incorporating a seventh embodiment of a control code generating apparatus according to the present invention, controlled by light emitted from an illumination and image apparatus.

FIG. 12 is a block diagram of the sound field variation circuit 7 which is shown in FIG. 12. In FIG. 12, $145_1$ denotes a first signal processing circuit, $145_2$ a second signal processing circuit, ... and $145_n$ denotes an $n^{th}$ signal processing circuit (where n is an integer). A control code input circuit 141 receives as input a control code that is produced from the sound field variation circuit control section 123 as described above. A control code decision circuit 142 serves to judge which one of the signal processing circuits, first, second, etc. corresponds to the control code that is currently being supplied to the control code input circuit 141. An A/D converter circuit 143 is utilized when an analog input audio signal is supplied to the sound field variation circuit 7, to convert the analog audio signal to a digital audio signal. A signal switching circuit 144 selects one of the signal processing circuits first $145_1$, second $145_2$, etc., to receive as input thereto a digital audio signal that is inputted to the sound field variation circuit 7 (or is produced from the output of the A/D converter circuit 143) Switching selection by the signal switching circuit 144 is based upon the results of a judgment made by the control code decision circuit 142.

In this embodiment, the first signal processing circuit $145_1$, $145_2$ a second signal processing circuit, ... and $n^{th}$ signal processing circuit $145_n$ provide respectively different values of gain (or attenuation).

The operation of this sound field variation apparatus is as follows. The output signal from the supplied to the sound field variation circuit control section 123 after having been converted into a suitable form for input to the sound field variation circuit control section 123 by means of the signal conversion section 122. In response to this signal, the sound optimum sound field that should be produced, based the visible display which is being provided by the illumination and image display apparatus at that time, outputs a control code for producing that sound variation circuit 7, which thereby executes digital processing of the input digital audio signal supplied thereto, for producing output audio signals which will produce the requisite sound field when amplified and supplied to one or more loudspeakers.

There is a 1:1 relationship between the possible different signals which can be produced from the signal input circuit 131 of the sound field variation circuit control section 123 and the input ports $A_1, A_2, A_3, \ldots A_k$, i.e. $k \geq m$.

Figure 13:
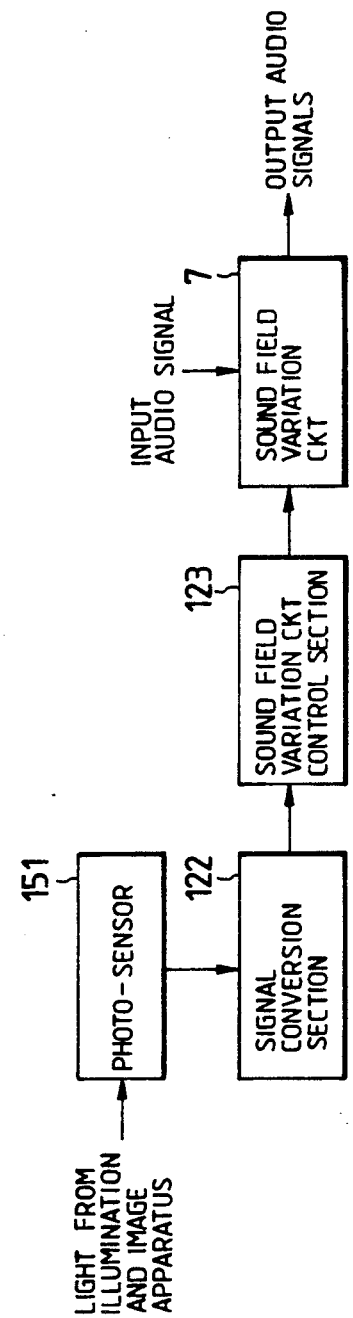

In addition, the relationship $m \leq n$ must be satisfied for the quantity m of FIG. 13 and the quantity n of FIG. 14.

The operation of the sound field variation circuit 7 is as follows. A control code is supplied from the sound field variation circuit control section 123 to the control code input circuit 141, and the control code decision circuit 142 judges which of the signal processing circuits, first, second, etc., corresponds to the control code that is currently being supplied to the control code input circuit 141.

For simplicity of description, audio amplifiers for receiving the output audio signal from the sound field variation circuit 7, to drive one or more loudspeakers, and a digital/analog conversion circuit for converting the output audio signal to analog form, are omitted from the drawings.

It can thus be understood that with this embodiment, an illumination and image apparatus control section 121 serves to control an illumination and image display apparatus, and a signal conversion circuit executes conversion of output signals produced from the illumination and image apparatus control section 121 into a suitable form for transfer to a sound field variation circuit control section which produces control codes for determining respective sound fields by audio signal processing executed by a sound field variation circuit. In this way, successive sound fields are produced which can be appropriately matched to the operation of the illumination and image display apparatus.

FIG. 13 is a general block diagram of a photo-synchronized sound field variation apparatus which incorporates a seventh embodiment of a sound field control code generating apparatus according to the present invention. In FIG. 13, light which is produced from a display that is generated by an illumination and image apparatus (not shown in the drawings) is received by a photo-sensor 151, which produces an output signal in accordance with at least one condition of that light (e.g. the intensity of the light). The output signal from the photo-sensor 151 is supplied to a signal conversion section 122 to be converted into a signal which is of suitable form for being transferred to a sound field variation circuit control section 123, as in the preceding embodiment. Sound field control codes are thereby produced from the sound field variation circuit control section 123 in accordance with the light which falls on the photo-sensor 151, (e.g. with a specific control code being produced in response to a corresponding specific level light), and are applied to a sound field variation circuit 7 for controlling digital processing of an input audio signal by the sound field variation circuit 7.

It can be understood that the operation of this embodiment is similar to that of the preceding embodiment, and differs only in that the sound field control codes are selected in accordance with light which is produced from a display that is generated by an illumination and image apparatus and is received by the photo-sensor 151. Thus, the sound field that is produced by the apparatus at a particular point in time will be determined by the display that is being produced by the illumination and image apparatus, and the sound fields that are produced by the apparatus can be freely matched to the operation of the illumination and image apparatus, irrespective of the particular type of illumination and image apparatus that is utilized.

The respective configurations of the sound field variation circuit 7, sound field variation circuit control section 123 and signal conversion section 122 of this embodiment can be substantially identical to those of the eighth embodiment described hereinabove.

What is claimed is:

1. A sound field variation apparatus for generating sound fields such as to produce respective sound images at specific positions within a listening room comprising:
    position data input means manually operable for arbitrarily selecting successive sound image positions within said listening room and for generating position control codes respectively corresponding to said sound image positions;
    set time data input means manually operable for arbitrarily selecting respective time durations for said sound image positions and for generating time data values respectively corresponding to said time durations;
    memory means for storing said position control codes and time data values;
    data register means for holding successive ones of said position control code; and
    control means for successively reading out each of said sound field position control codes from said memory together with a corresponding one of said time data values, for transferring said position control code to said data register, and for transferring a succeeding one of said position control codes to said data register when a time interval expressed by said corresponding time data value has elapsed;
    a source of an input audio signal;
    a plurality of loudspeakers;
    sound field variation circuit means coupled to receive a currently held position control code from said data register, and to receive said input audio signal, for processing said input audio signals to produce output signals for driving said loudspeakers to produce a sound field which is determined by said position control code; and
    display means coupled to said position data input means, for producing a miniaturized display representing said listening room and representing respective sound image positions corresponding to position control codes which are outputted from said position data input means.

2. The apparatus as claimed in claim 1, wherein said display means further provides representations of respective time durations which are established for said sound image positions.

3. A sound field variation apparatus generating sound fields such as to produce respective sound images at specific positions within a listening room, comprising:
    position data input means manually operable for arbitrarily selecting successive sound image positions within said listening room and for generating position control codes respectively corresponding to said sound image positions;
    set time data input means manually operable for arbitrarily selecting respective time durations for said sound image positions and for generating time data values respectively corresponding to said time durations;
    memory means for storing said position control codes and time data values;
    data register means for holding successive ones of said position control code; and
    control means for successively reading out each of said sound field position control codes from said memory together with a corresponding one of said time data values, for transferring said position control code to said data register, and for transferring a succeeding one of said position control codes to said data register when a time interval expressed by said corresponding time data value has elapsed;
    a source of an input audio signal;
    a plurality of loudspeakers;
    sound field variation circuit means coupled to receive a currently held position control code from said data register, and to receive said input audio signal, for processing said input audio signals to produce output signals for driving said loudspeakers to produce a sound field which is determined by said position control code;
    wherein said control means functions such that each time duration for which a position control code is held in said data register is made a multiple of a corresponding time duration value measured by said timer circuit means.

4. A sound field variation apparatus comprising:
    a source of an input audio signal and a source of a video signal;
    means for selecting successive sound fields and for generating sound field control codes respectively corresponding to said sound fields;
    control code recording means for recording said sound field control codes on a first audio recording track of a video tape, and video and audio signal recording means for recording said audio signal on a second audio recording track of said video tape and said video signal on a video recording track of said video tape, concurrent with recording of said sound field control codes;
    control code playback means for playback of said sound field control codes from said video tape, and video and audio signal playback means for playback of said input audio signal and video signal from said video tape concurrent with playback of said control codes;
    a plurality of loudspeakers; and
    sound field variation circuit means coupled to receive said input audio signal from said video and audio signal playback means and to receive said sound field control codes from said control code playback means, for processing said input audio signal to produce output audio signals for driving said loudspeakers to produce sound fields which are respectively determined by said sound field control codes.

5. The apparatus as claimed in claim 4, wherein said means for selecting and generating successive sound fields comprises manually actuatable soundfield selection means, operable for arbitrarily selecting successive ones of said sound fields and outputting control codes respectively corresponding to said selected sound fields.

6. The apparatus as claimed in claim 4, wherein said source of a video signal is a video camera having a zoom lens, and wherein said means for selecting successive sound fields comprises zoom factor detection means for detecting a value of zoom factor at which said lens is currently set and for producing an output signal in accordance with said value of zoom factor, and control code generating means for selecting a sound field in accordance with said output signal from said zoom factor detection means and producing a sound field control code in accordance with the selected sound field.

7. A sound field variation apparatus for generating sound fields such as to produce respective sound images at specific positions within a listening room, comprising:
position data input means manually operable for arbitrarily selecting successive sound image positions within said listening room and for generating position control codes respectively corresponding to said sound image positions;
set time data input means manually operable from arbitrarily selecting respective time durations for said sound image positions and for generating time data values respectively corresponding to said time durations;
memory means for storing said position control codes and time data values;
data register means for holding successive ones of said position control code; and
control means for successively reading out each of said sound field position control codes form said memory together with a corresponding one of said time data values, for transferring said position control code to said data register, and for transferring a succeeding one of said position control codes to said data register when a time interval expressed by said corresponding time data value has elapsed;
a source of an input audio signal;
a plurality of loudspeakers;
sound field variation circuit means coupled to receive a currently held position control code from said data register, and to receive said input audio signal, for processing said input audio signals to produce output signals for driving said loudspeakers to produce a sound field which is determined by said position control code.

8. The sound field variation apparatus for generating sound fields such as to produce respective sound images at specific sound image positions within a listening room, comprising:
position data input means manually operable for arbitrarily selecting successive sound image positions within said listening room and for generating position control codes respectively corresponding to said sound image positions;
timer circuit means coupled to said position data input means, functioning when each of said sound image positions is selected for measuring a time duration corresponding to said each sound image position which elapses between a point in time at which said selection occurs and a point in time at which a succeeding selection is executed, and for generating time data values respectively corresponding to said time durations;
memory means for storing said position control codes and time data values;
data register means for holding successive ones of said position control codes;
control means for successively reading out each of said position control codes from said memory together with a corresponding one of said time data values, for transferring said position control code to said data register means, and for transferring a succeeding one of said position control codes to said data register means when a time interval expressed by said corresponding time data value has elapsed;
a plurality of loudspeakers; and
sound field variation circuit means coupled to receive an input audio signal and to receive a position control code currently held in said data register means, and controlled by said position control code for processing said input audio signal to produce output audio signals for driving said loudspeakers to produce a sound field which is determined by said position control code such as to produce a sound image at a specific position within said listening room.

9. The apparatus as claimed in claim 6, further comprising: display means coupled to said position data input means, for producing a miniaturized display representing said listening room and representing respective sound image positions corresponding to said position control codes which are outputted from said position data input means.

10. The apparatus as claimed in claim 9, wherein said display means further provides representations of said respective time durations which are established for said sound image positions.

11. The apparatus as claimed in claim 8, wherein said control means function such that each time duration for which a position control code is held in said data register is made a multiple of a corresponding time duration value measured by said timer circuit means.

12. A sound field variation apparatus comprising:
input means for generating sound field control codes and sound field variation circuit means controlled by said sound field control codes, said input means being operable for arbitrarily selecting successive sound fields by generating sound field control codes respectively corresponding to said sound fields, for inputting time data values representing respective time durations for which said control codes are to be supplied to said soundfield variation circuit means, for inputting a data value representing a number of successive repetitions of a program, said program consisting of generation of said selected soundfields for said respective durations in a fixed sequence, and for inputting data values respectively representing a starting and a finishing time point of said successive repetitions of the program;
first memory means for storing said control codes and for storing data representing a sequence in which said control codes are to be outputted therefrom;
second memory means for storing said time data values;

third memory means for storing said data values representing a number of program repetitions and starting and finishing time points;

first control circuit means for successively reading out said stored control codes from said first memory means and corresponding time data values from said second memory means; and second control circuit means for controlling the repetitions of said program and for initiating and terminating said program repetitions based on said data values stored in said third memory means;

a plurality of loudspeakers;

said sound field variation circuit means being coupled to receive an input audio signal and to successively receive said control codes from said first memory means in said sequence, each said control code being supplied to said sound field variation circuit means for a time duration determined by a corresponding one of said time data values, said sound field variation circuit processing said input audio signal to produce output audio signals for driving said loudspeakers to produce sound fields which are respectively determined by said control codes.

13. In an apparatus including illumination and image generating apparatus control means for controlling the operation of an illumination and image generating apparatus, a sound field variation apparatus for driving a plurality of loudspeakers to produce predetermined sound fields, comprising:

sound field control code generating means for generating sound field control codes;

signal conversion means coupled to receive a control signal produced from said illumination and image generating apparatus control means, for converting said control signal to a suitable form for transfer to said sound field control code generating means and supplying a converted signal obtained thereby to said control code generating means, to determine specific sound field control codes that are generated by said sound field control code generating means;

a plurality of loudspeakers;

sound field variation circuit means coupled to receive an input audio signal and to receive said specific sound field control codes, for processing said input audio signal to produce output audio signals for driving said loudspeakers to produce sound fields which are respectively determined by said sound field control codes.

14. In an apparatus including illumination and image generating apparatus control means for controlling the operation of an illumination and image generating apparatus, a sound field variation apparatus for driving a plurality of loudspeakers to produce predetermined sound fields, comprising:

sound field control code generating means for generating sound field control cods;

photo-sensing means for detecting light which is produced from said illumination and image generating apparatus and producing a corresponding detection signal;

signal conversion means coupled to receive said detection signal, for converting the detection signal to a suitable form for transfer to said sound field control code generating means, and for supplying a converted signal obtained thereby to said control code generating means to determine specific control codes that are generated by said sound field control code generating means; and a plurality of loudspeakers; and sound field variation circuit means coupled to receive an input audio signal and to receive said specific sound field control codes, for processing said input audio signal to produce output audio signals for driving said loudspeakers to produce sound fields which are respectively determined by said sound field control codes.

* * * * *